Figure 1:
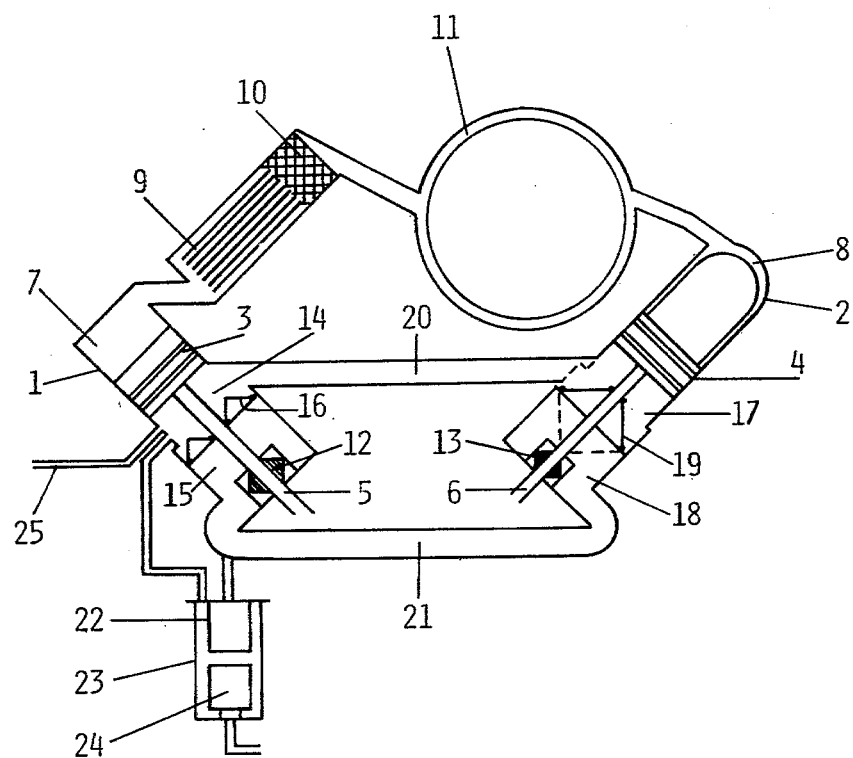

United States Patent [19]

Lundholm

[11] 4,257,230

[45] Mar. 24, 1981

[54] HOT GAS ENGINE COMPRISING SEALING MEANS AROUND PISTON RODS

[76] Inventor: S. Gunner K. Lundholm, Mantalskroken 9, S 222 47 Lund, Sweden

[21] Appl. No.: 971,876

[22] Filed: Dec. 21, 1978

[30] Foreign Application Priority Data

Dec. 31, 1977 [GB] United Kingdom ............. 54403/77

[51] Int. Cl.³ ............................................. F02G 1/043
[52] U.S. Cl. ..................................... 60/517; 92/165 R
[58] Field of Search ......................... 60/516, 517, 525; 92/165, 166, 168, 98 D; 277/3

[56] References Cited

U.S. PATENT DOCUMENTS

| | | | |
|---|---|---|---|
| 3,568,436 | 3/1971 | Heffner et al. ......................... | 60/517 |
| 3,667,348 | 4/1970 | Neelen ................................... | 60/517 |
| 3,848,877 | 11/1974 | Bengtsson et al. ..................... | 60/517 |
| 4,055,952 | 11/1977 | Johansson et al. ..................... | 60/517 |

Primary Examiner—James J. Gill
Attorney, Agent, or Firm—Finnegan, Henderson, Farabow, Garrett & Dunner

[57] ABSTRACT

Oil-tight flexible partitions are provided to prevent oil leakage to the working gas of a Stirling cycle engine along the piston rods from oil-lubricated reciprocating seals. The upper and lower chambers formed in part by the flexible partitions are interconnected through an oil filter for preventing oil leakage to the upper chambers while minimizing the pressure differential across the flexible partitions by allowing gas flow between the upper and lower chambers.

5 Claims, 2 Drawing Figures

HOT GAS ENGINE COMPRISING SEALING MEANS AROUND PISTON RODS

This invention relates to a multi-cylinder hot gas engine of the kind (herein called "the kind defined") in which each cylinder contains a piston connected to a piston rod which extends through a seal and a casing wall and is connected to a drive mechanism located in a casing in which the pressure is substantially lower than the minimum pressure in the cylinders, the said piston rods being oil-lubricated in said casing.

The working gas in the cylinders of a hot gas engine is used in thermodynamic closed working cycles, and should not be allowed to leak into a crank-casing of the engine nor anywhere else. The seals commonly used for preventing leakage around the piston rods are oil-lubricated so that oil films increase the effectiveness of the seals.

However, some of the oil on the piston rods is usually drawn from the crank-casing through the seals but this oil should be prevented from entering into the working gas in the cylinders.

To prevent oil from entering the working gas it has hitherto been common to use oil scraper rings and to direct a gas flow through the surroundings of each scraper ring and towards a filter in which any oil may be separated and drained off.

The present invention is intended to provide a hot gas engine of the kind defined with means to prevent any oil from passing along the piston rods from the crank-casing into the working gas charges.

According to the invention an engine of the kind defined is characterised in that each piston rod extends through a chamber which is divided into a chamber upper part and a chamber lower part by means of a respective flexible partition rigidly connected in oil-tight manner to said piston rod and also connected directly or indirectly to a wall or walls of said chamber.

Figure 2:
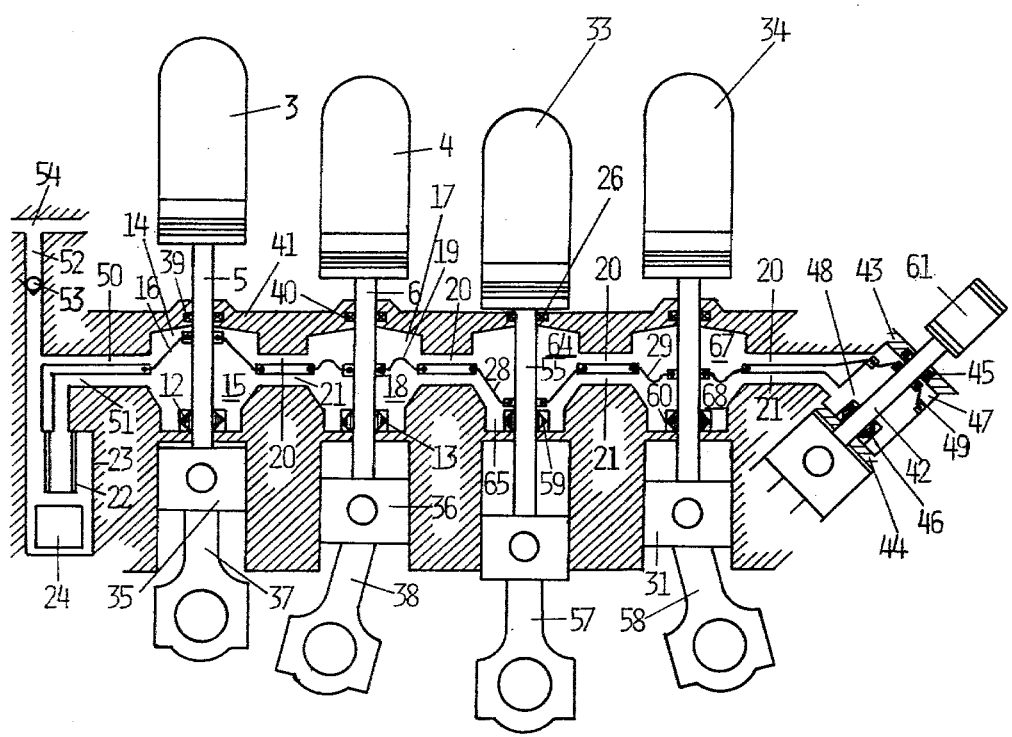

How the invention may be put into practice appears from the following description with reference to the accompanying drawings, in which FIG. 1 schematically shows parts of a two-cylinder hot gas engine according to the invention, and FIG. 2 schematically shows parts of a four-cylinder double-acting hot gas engine embodying the invention.

As shown in FIG. 1 the engine comprises a compression cylinder 1 with a piston 3 and an expansion cylinder 2 with a piston 4. The pistons 3 and 4 are connected to respective piston rods 5 and 6 which in turn are connected to a common crank of a crankshaft (not shown). The space 7 above the piston 3 in the cylinder 1 is connected to the space 8 above the piston 4 in the cylinder 2 through a cooler 9, a regenerator 10 and a heater 11.

Seals 12, 13 are provided at the bottom walls of the cylinders 1 and 2 around the respective piston rods 5 and 6. The interior of the cylinder 1 below the piston 3 forms a chamber which is divided into a chamber upper part 14 and a chamber lower part 15 by means of a flexible partition 16 rigidly connected in oil-tight manner to the piston rod 5 and also directly or indirectly to the wall or walls of the said chamber.

The interior of the cylinder 2 below the piston 4 forms a chamber which is divided into a chamber upper part 17 and a chamber lower part 18 by means of a flexible partition 19 rigidly connected in oil-tight manner to the piston rod 5 and also directly or indirectly to the wall or walls of this chamber.

The two chamber upper parts 14 and 17 are interconnected by a gas passage providing a buffer space 20, and the two chamber lower parts 15 and 18 are interconnected by a gas passage which provides a buffer space 21. The two buffer spaces 20, 21 are interconnected through ducts leading to an oil filter 22 arranged in a container 23 provided with a float valve 24 controlling a drain.

A conduit 25 is provided for increasing or reducing the amount of gas in the buffer spaces 20, 21.

The engine of FIG. 1 will operate as follows:

The spaces 7, 8 as well as the interior of the cooler 9, the regenerator 10 and the heater 11 are filled with a charge of working gas—e.g. helium or hydrogen. The charge is compressed in the space 7 at a low temperature and is transferred to the space 8. During the transfer it is heated and in the space 8 it is allowed to expand. Subsequently it is transferred back to the space 7 while being cooled in the regenerator 10 and the cooler 9. In the space 7 the charge is again compressed at the low temperature.

In order to relieve the crank mechanism (not shown) of the engine from a part of the forces caused by the gas charge, the chamber parts 14, 15 and 17, 18 and the buffer spaces 20, 21 are filled with gas at a varying pressure the mean value of which corresponds to the mean value of the varying pressure above the pistons 3, 4. Due to the movements of the flexible partitions 16 and 19 and the pistons 3 and 4 the sum of the volumes of the chamber parts 14 and 17 and the buffer space 20 will vary and so will the sum of the volumes of the chamber parts 15 and 18 and the buffer space 21.

In order to relieve the flexible partitions 16 and 17 from some stresses, the buffer space 20 is connected to the buffer space 21 through the filter 22, allowing the passage of gas but not of oil.

The seals 12 and 13 are oil-lubricated. Oil is applied to the parts of the piston rods 5 and 6 extending into the crank casing (not shown) and some oil will be drawn through the sliding seals 12 and 13, effectively preventing leakage of gas into the crank casing. However, the oil entering into the chamber lower parts 15 and 18 should be prevented from entering into the working gas in the cylinders.

During operation of the engine slight oscillating differences will arise between the gas pressures in the two buffer spaces 20 and 21 and cause oscillating gas flows through the filter 22. Oil leaking into the chamber lower parts 15 and 18 will consequently accumulate in the container 23, and will eventually be drained off.

The mean gas pressure in the buffer spaces 20 and 21 and in the chamber parts 14, 15 and 17, 18 is regulated by supplying or withdrawing gas through the conduit 25 with the aid of pumping means (not shown) so that this mean pressure corresponds to the mean pressure of the working gas above the pistons 3 and 4.

FIG. 2 shows a four-cylinder double-acting hot gas engine including a compressor to be used in the power control system. The cylinders of the engine and of the compressor are omitted to simplify the drawing.

The engine comprises pistons 3, 4, 33, 34 secured to respective piston rods 5, 6, 55, 56 connected to a drive mechanism through respective cross-heads 35, 36, 30, 31 and connecting rods 37, 38, 57, 58 located in a crank casing (not shown). Seals 12, 13, 59, 60 are provided around the piston rods 5, 6, 55, 56 at a wall through which the four piston rods extend into the crank casing.

Further sliding seals 39, 40, 26, 27 surround the respective piston rods 5, 6, 55, 56 at a partition wall 41 located between the pistons 3, 4, 33, 34 and the seals 12, 13, 59, 60. Flexible partitions 16, 19, 28, 29 are connected to the piston rods 5, 6, 55, 56 respectively and to side walls of four chambers including an upper chamber 14, 17, 64 or 67 and a lower chamber part 15, 18, 65 or 68.

The compressor used for the power control system comprises a piston 61 secured to a piston rod 42 extending through two walls 43 and 44. Sliding seals 45 and 46 are provided around the piston rod 42 at said walls 43 and 44. A chamber located between the walls 43 and 44 is divided into two chamber parts 47 and 48 by a flexible partition 49 rigidly connected in oil-tight manner to the piston rod 42 and directly or indirectly to side walls of this chamber.

All the upper parts 14, 17, 64, 67, and 47 of the chambers are interconnected by gas passages 20, and all the chamber lower parts are interconnected by gas passages 21. The passages 20 and 21 allow gas to pass between the respective interconnected chamber parts, which have variable volumes although in operation the sum of their volumes remains almost unchanged.

The gas pressure in the chamber parts does not have a buffer effect, since the drive mechanism of a double-acting engine is exposed only to the effective pressure difference across the pistons.

However, it is practical to maintain in the chamber parts a pressure almost corresponding to the minimum pressure of the working gas.

The chamber upper and lower parts are interconnected through conduits 50 and 51 and through an oil filter 22 located in a container 23 provided with a float valve 24.

A conduit 52 provided with a check valve 53 is connected to the conduit 50 as well as to a conduit 54 in which the pressure is equal to the minimum cylinder gas working cycle pressure.

The engine illustrated in FIG. 2 will operate as follows:

The seals 12, 13, 59, 60, 46 are lubricated with oil, a small amount of which enters into the chamber lower parts 15, 18, 65, 68 and 48. However, the oil is prevented from entering into the chamber upper parts 14, 17, 64, 67, 47 by the flexible partitions 16, 19, 28, 29, 49. The flexible partitions are not exposed to any substantial stresses due to gas pressure because the upper and lower parts of the chambers are interconnected through the conduits 50 and 51, whilst the filter 22 prevents oil from passing into the chamber upper parts.

The sliding seals 39, 40, 26, 27, and 45 are not lubricated and will not completely prevent leakage of gas into the upper parts 14, 17, 64, 67, 47 of the chambers. The conduit 52 including the check valve 53 will ensure that the pressure in all the upper and lower parts of the chambers between the respective sliding seals will correspond to the minimum gas pressure in the working gas charges of the engine.

Oil is prevented from reaching the seals 39, 40, 26, 27 and 45 by the respective flexible partitions 16, 19, 28, 29 and 49.

What we claim is:

1. A multi-cylinder hot gas engine of the kind in which each cylinder contains a piston connected to a piston rod which extends through a reciprocating seal and a casing wall and is connected to a drive mechanism located in the casing in which the pressure is substantially lower than the minimum pressure in the cylinders, the piston rods being oil-lubricated in the casing and providing oil-lubrication for the reciprocating seals, characterized in that each piston rod extends through a chamber formed in part by the respective piston and the casing wall, and that a flexible partition is positioned in said chamber between the reciprocating seal and the respective piston for preventing contamination of the gas by oil leakage along said piston rod through the respective oil-lubricated reciprocating seal, said chamber being divided into a chamber upper part and a chamber lower part by said respective flexible partition.

2. An engine according to claim 1, wherein all the chamber lower parts are connected through an oil filter to a space in which the minimum cylinder gas pressure prevails.

3. An engine according to claim 2, in which all the chamber lower parts are interconnected through gas passages.

4. An engine according to claim 1, in which all the chamber upper parts are interconnected through gas passages.

5. An engine according to claim 1, in which a gas compressor is used in the engine power control system, and a piston rod of the gas compressor is provided with a flexible partition in the same way as each of the engine piston rods.

* * * * *

UNITED STATES PATENT AND TRADEMARK OFFICE
CERTIFICATE OF CORRECTION

PATENT NO. : 4,257,230

DATED : March 24, 1981

INVENTOR(S) : S. Gunnar K. Lundholm

It is certified that error appears in the above—identified patent and that said Letters Patent is hereby corrected as shown below:

On the title page, Item [76] should read:

-- S. Gunnar K. Lundholm --.

Signed and Sealed this

Second Day of June 1981

[SEAL]

Attest:

RENE D. TEGTMEYER

Attesting Officer

Acting Commissioner of Patents and Trademarks